United States Patent
Mopur et al.

(10) Patent No.: US 11,361,245 B2
(45) Date of Patent: Jun. 14, 2022

(54) INTELLIGENT IOT DATA SPLIT MANAGEMENT

(71) Applicant: Hewlett Packard Enterprise Development LP, Houston, TX (US)

(72) Inventors: Satish Kumar Mopur, Bangalore (IN); Saikat Mukherjee, Bangalore (IN); Gunalan Perumal Vijayan, Bangalore (IN); Sridhar Balachandriah, Bangalore (IN); Ashutosh Agrawal, Bangalore (IN); Krishnaprasad Lingadahalli Shastry, Bangalore (IN); Gregory S. Battas, Fishers, IN (US)

(73) Assignee: Hewlett Packard Enterprise Development LP, Houston, TX (US)

(*) Notice: Subject to any disclaimer, the term of this patent is extended or adjusted under 35 U.S.C. 154(b) by 795 days.

(21) Appl. No.: 16/100,076

(22) Filed: Aug. 9, 2018

(65) Prior Publication Data

US 2020/0050578 A1 Feb. 13, 2020

(51) Int. Cl.
*G06F 15/16* (2006.01)
*G06N 20/00* (2019.01)
*H04L 67/12* (2022.01)
*G06F 9/54* (2006.01)

(52) U.S. Cl.
CPC .............. *G06N 20/00* (2019.01); *G06F 9/543* (2013.01); *H04L 67/12* (2013.01)

(58) Field of Classification Search
CPC ......... G06F 9/543; G06N 20/00; H04L 67/12; H04L 67/28
See application file for complete search history.

(56) References Cited

U.S. PATENT DOCUMENTS

| | | | |
|---|---|---|---|
| 9,503,466 B2 | 11/2016 | Vasseur et al. | |
| 2016/0300156 A1* | 10/2016 | Bowers | ..................... G06F 9/46 |
| 2017/0124487 A1 | 5/2017 | Szeto et al. | |
| 2018/0060759 A1* | 3/2018 | Chu | ....................... G06N 20/00 |

OTHER PUBLICATIONS

Evaluate Model, (Web Page), Jan. 10, 2018, 35 Pgs., https://docs.microsoft.com/en-us/azure/machine-learning/studio-module-reference/evaluate-model.

\* cited by examiner

*Primary Examiner* — Normin Abedin
(74) *Attorney, Agent, or Firm* — Hewlett Packard Enterprise Patent Department

(57) ABSTRACT

The disclosure relates to technology that implements flow control for machine learning on data such as Internet of Things ("IoT") datasets. The system may route outputs of a data splitter function performed on the IoT datasets to a designated target model based on a user specification for routing the outputs. In this manner, the IoT datasets may be dynamically routed to target datasets without reprogramming machine-learning pipelines, which enable rapid training, testing and validation of ML models as well as an ability to concurrently train, validate, and execute ML models.

11 Claims, 5 Drawing Sheets

INTELLIGENT IOT DATA SPLIT MANAGEMENT

DESCRIPTION OF RELATED ART

In an Internet of Things ("IoT") environments, data pattern from endpoints such as sensors can change over time. New sensors maybe added or data preprocessing maybe refined, resulting in a situation that demands continuous refining or recalibrating Machine-Learned ("ML") models learned therefrom, to adapt to the changes, and deliver expected and accurate analytic results. ML models deployed at an edge device perform real time analytics operations such as prediction, while the edge device continuously transmits sensor data to a core environment for training and testing ML models based on the sensor data. Hence an ML model is required to continuously learn from the data stream at an IoT core environment and be periodically refined for consistent, accurate results, and re-deployed at the edge. Further, to enable accurate real time analytics, the continuous learning process will have to rapid. An improper choice of ML models post training and testing can lead to erroneous predictions or classification, which will subsequently result in untimely and improper actions. This hinders the ability of an IoT system to support rapid and efficient real time actions.

There is therefore a need for a solution that enables rapid training, testing and validation of ML models through a controlled process to enable a user to effectively train and test the performance of multiples models concurrently, in a continuous and timely manner, and enable subsequent deployment of accurate and efficient models to the IoT edge. These and other drawbacks exist for conventional IoT systems that train, validate, test, and use ML models.

DETAILED DESCRIPTION

The disclosure relates to an intelligent IoT dataset split management and training control based on a flow based programming model for ML model training, validation and testing at an IoT core environment off incoming data from an IoT edge environment. In an implementation, a system of implementing the intelligent IoT dataset split management and training control may obtain, as input, dynamic user-defined functionality. For example, a user may specify splitter functions that split data to targeted groups of ML models. The system may build and store this mapping in an association map table. The dynamic user-defined functionality may be input by a user to specify which data from endpoint devices (which may be obtained through edge devices) should be obtained, how such data should be split into different datasets for ML training, and which models the split data should be applied to.

Figure 1:
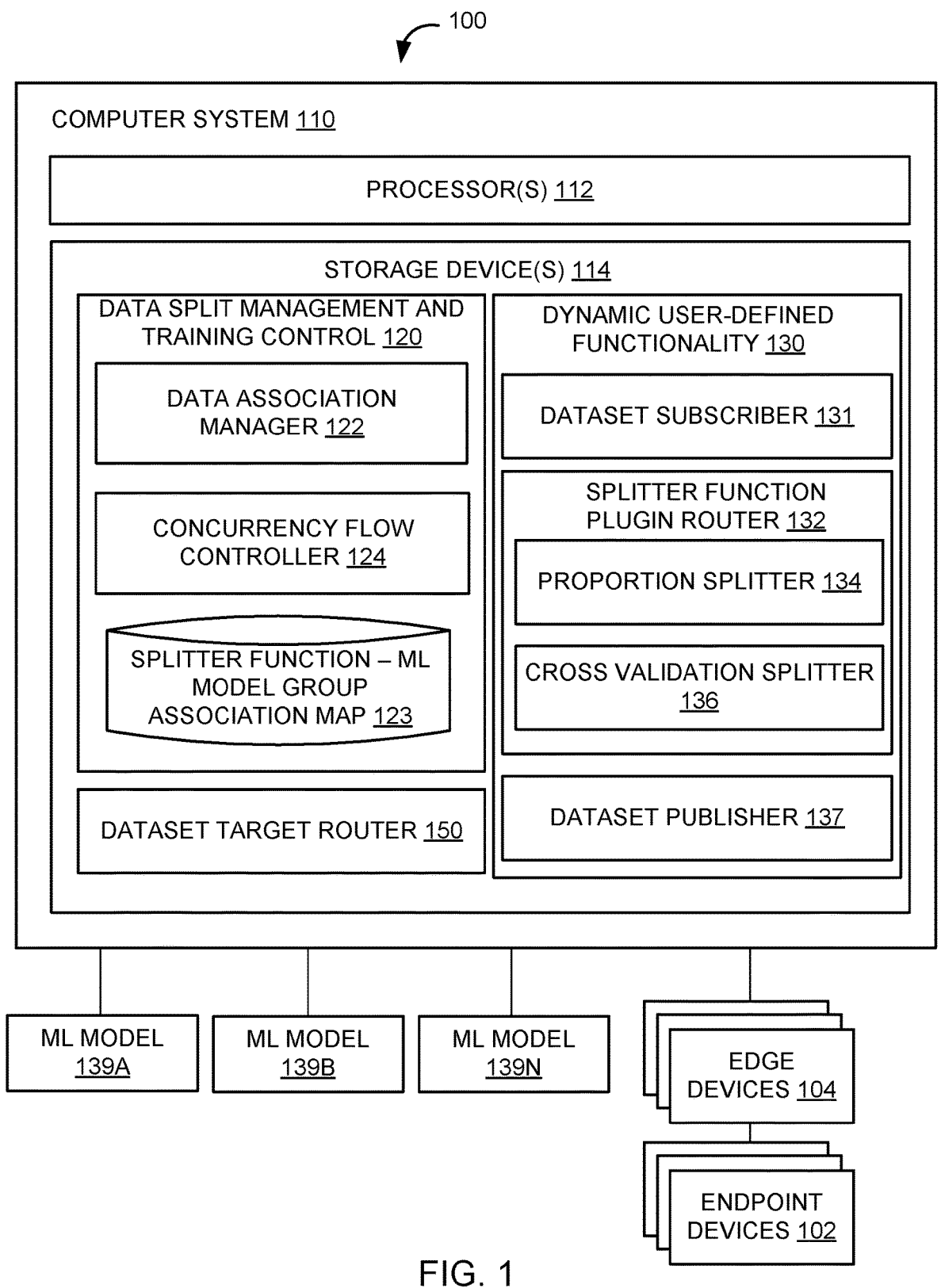
FIG. 1 illustrates an example of a system of providing intelligent data split management of machine-learned models from datasets in an IoT environment, according to an implementation of the disclosure.

FIG. 1 illustrates an example of a system 100 of providing intelligent data split management of machine-learned models from datasets in an IoT environment, according to an implementation of the disclosure.

In an implementation, system 100 may include one or more endpoint devices 102, one or more edge gateways or servers 104, a computer system 110, and/or other components. Endpoint devices 102 may include devices at the end of a network that is a source of data. These endpoint devices may include an IoT device that generates IoT data, such as a sensor device that generates sensor data. An edge device 104 may include a gateway or server device at an edge of a network. Typically, though not necessarily, the edge device 104 may gather data from one or more endpoint devices 102 and provide the gathered data to a core environment, such as to the computer system 110. The computer system 110 may use the data from one or more of the edge devices 104 to train, test, and validate one or more ML models 139 (illustrated as ML model 139A, ML model 139B, ML model 139N). The edge devices 104 perform data analytics on incoming data from the endpoint devices 102 using the ML models 139.

The computer system 110 may include one or more processor(s) 112 (also interchangeably referred to herein as processor(s) 112, processor(s) 112, or processor(s) 112 for convenience), one or more storage devices 114 (which may store a data association manager 122, a concurrency flow controller 124, and a splitter function-ML model group association map 123), and/or other components. Processor(s) 112 may be programmed by one or more computer program instructions. For example, processor(s) 112 may be programmed by the data association manager 122, the concurrency flow controller 124, the dynamic user-defined functionality 130, the dataset target router 150, and/or other instructions.

In an implementation, the data association manager 122 may obtain, as input, dynamic user-defined functionality 130. For example, a user may specify which splitter function splits data to which targeted group of ML models 139, in an association template presented to the user. This is received by the data association manager 122 and stored as an association map table, such as the splitter function-ML model group association map 123. The dynamic user-defined functionality 130 may be input by a user to specify which data from the endpoint devices 102 (obtained through the edge devices 104) should be obtained, how such data should be split into different datasets for ML training, and which models the split data should be applied to.

Based on this input, the data association manager 122 may build the splitter function-ML model group association map 123, which maintains an association map between a splitter function and targeted set of ML models 139 to which the dataset is intended to for training. The data association manager 124 may later look up the association map and deploys the specified splitter functions into the splitter function plugin router 132. The dynamic user-defined functionality 130 is "dynamic" in that the splitter function-ML model group association map 123 generated based on it may be used to dynamically create concurrency flows by the concurrency flow controller 124. For example, upon user initiation or other start trigger, the concurrency flow controller 124 activates all the defined flow paths, which may run concurrently. These concurrency flows may define functionality to train, test, and validate the ML models 139, as will be described below. In some implementations, the user may create the flow paths themselves with additional pre-processing functions in the data path and instruct the concurrency flow controller 124 to control the equivalent flow paths to the specified ML models 139.

The dynamic user-defined functionality 130 may be input by a user and result in various functionality. This functionality may include, for example, a dataset subscriber 131, a splitter function plugin router 132 (which itself may have a proportion splitter 134 and a cross validation splitter 136), a dataset publisher 137, and/or other user-defined functionality. The user-defined functionality may be used by the data association manager 122 to create mappings used by the concurrency flow controller 124 to generate concurrency flows for ML training, testing, and validating. Thus, based on user inputs on the number of models or versions to be evaluated on a dataset, the concurrency flow controller 124 defines and spins multiple concurrent instances of data flow that fetches, and routes the dataset from a specified splitter function to the group of ML models 139 to be trained, using the splitter function-ML model group association map 123.

The dataset subscriber 131 may identify datasets of interest to use for training, validating, and/or testing for ML models 139. This dataset of interest may be identified based on an identification of endpoint devices 102 and/or edge devices 104. In this example, a user may indicate an interest in obtaining datasets from particular sets endpoint devices 102 through edge devices 104. In some instances, the dataset of interest may be identified based on dates of creation. In this example, a user may indicate an interest in obtaining datasets from a particular time period (or only most recent datasets). In some instances, the dataset of interest may be identified based on whether the data has already been used. In this example, a user may indicate an interest in obtaining datasets that are not stale or have not already been used in a ML iteration. Other ways in which to identify datasets of interest, including combinations of the foregoing examples may be used. In whichever manner the datasets of interest are specified by the user, the dataset subscriber 131 may subscribe to and obtain the identified datasets for training, validating, and testing ML models 139. In this manner, a user may be able to dynamically specify datasets of interest (also referred to as "subscribed datasets"), to be processed via concurrency flows described herein.

Once the datasets of interest has been identified, the user may specify how the subscribed datasets should be split. Doing so enables a user to dynamically specify data splitting conditions for concurrent flows. Thus, a user may be able to cause concurrent iterations of ML on datasets of interest, while specifying how the datasets should be split. Based on this split specification, the splitter function plugin router 132 may be implemented. The splitter function plugin router 132 may be implemented in the data path that routes incoming training dataset to a user-specified splitter function, and abstracts the deployed splitter functions. A user may plugin a new splitter function or replace an existing splitter function dynamically using this manager. The splitter function plugin router 132 may have a proportion splitter 134 and a cross validation splitter 136. The proportion splitter 134 takes as input a proportion input (e.g., percentage or ratio) that specifies how to apportion the subscribed dataset into training datasets, test datasets, validation datasets, and/or other datasets for ML. The cross validation splitter 136 may alternatively or further split the subscribed data into validation and/or test sets for validating or testing the relevant ML models 139. In some instances, the user may provide one or more custom splitter functions for splitting the data. In this manner, the system facilitates deployment of customized data splitting and routing.

The dataset publisher 137 may publish the data splitter function output (the output of the data splitting) for routing to a target ML model 139. The target ML model 139 may be specified by the user via the dataset publisher 137. In this manner, the user may select datasets for training, validating, and testing a specific ML model 139, which can include a specific version of a model or different models altogether. The dataset target router 150 may obtain the published split datasets and route them to the appropriate ML models 139 for training, validating, and testing. The dataset target router 150, which may be controlled by the concurrency flow controller 124, may be implemented in the data flow path that routes the split datasets to the specified multiple ML models 139.

In an implementation, the concurrency flow controller 124 implements flow based programming for the entire data path from ingest from an intermediary store 106 to the ML models 211. In some instances, the concurrency flow controller 124 implements flow based programming as a foundation for enabling continuous learning based on incoming data from the endpoint devices 102 (through the edge devices 104). For example, the concurrency flow controller 124 may deploy and create concurrent data flow paths based on the user-defined functions, the splitter function plugin router 132, and the dataset targets router 150.

Figure 2:
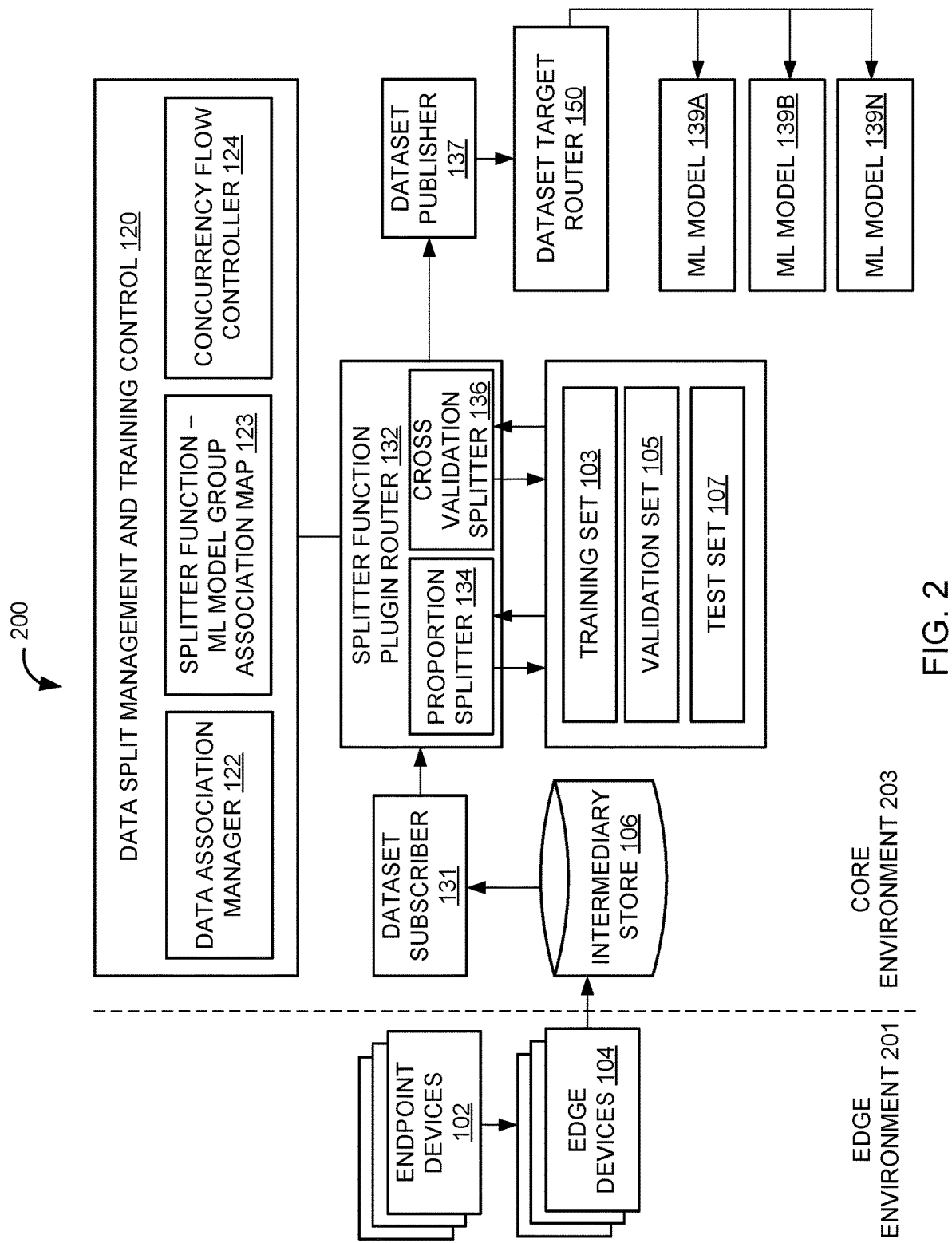
FIG. 2 illustrates a schematic of an example of a data flow in a system of providing intelligent data split management of machine-learned models from datasets in an IoT environment, according to an implementation of the disclosure.

FIG. 2 illustrates a schematic of an example of a data flow 200 in a system of providing intelligent data split management of machine-learned models from datasets in an IoT environment, according to an implementation of the disclosure. In the Figures, like reference symbols throughout this disclosure represent the same elements. In the example that follows, the endpoint devices 102 will be described as sensor devices, in an IoT environment, that each produce sensor data collected by the edge devices 104 and used to train, validate, and test ML models 139 relating to the sensor data. The ML models 139 in these examples may each model various aspects of the sensor data. For example, the ML models 139 may be trained to predict when a sensor will fail, when a device monitored by a sensor will fail, when sensor data indicates a dangerous condition exists (e.g., imminent or actual collision or other emergency situation), etc. It should be noted, however, that the endpoint devices 102 are not limited to sensor devices, and the ML models 139 are not limited to modeling sensor data.

In an implementation, sensor data may be produced by the endpoint device 102, such as a sensor device. The sensor data may include operational data associated with itself (e.g., diagnostic data, battery data, etc.), sensed data of another device, sensed data of an environment, and/or other types of sensor data. The sensor data may be collected by an edge device 104, such as an edge server or edge gateway. The sensor data may flow from the edge environment 201 to a core environment 203, into an intermediary store 106 of the core environment 203. A user may dynamically specify data flows (indicated by operational/instruction blocks 131-137) that follow.

Dataset subscriber 131 may read data from the intermediary store 106. Through the dataset subscriber 131, which is specified by the user, the user may identify which datasets from the intermediary store 106 to use in a given concurrent flow for ML training, validating, and testing.

The splitter function router function 132, based on its proportion splitter 134, cross validation splitter 136, and/or custom splitter function from a user may be implemented as a plugin into a data splitter manager in a concurrent flow that splits subscribed data into a training set 103, a validation set 105, and a test set 107, which may be stored in a transient datastore.

The dataset publisher 137 may obtain the split data and publishes them to the dataset target router 150, which provides the data to appropriate ML Models 139 for which they are targeted. The ML models 139 are then subjected to training and evaluation.

In an implementation, the user may observe responses of ML models 139 on the dataset. As an example, the user observes that ML model 139A has a more accurate output on test and validated datasets than, for example, ML model 139B. In some instances, the ML model 139A may be the same model but different version than ML model 139B. In other instances, the ML model 139A may be an entirely different model than ML model 139B. The user may choose this model to be deployed on the appropriate edge device 104 for requirements such as prediction.

Figure 3:
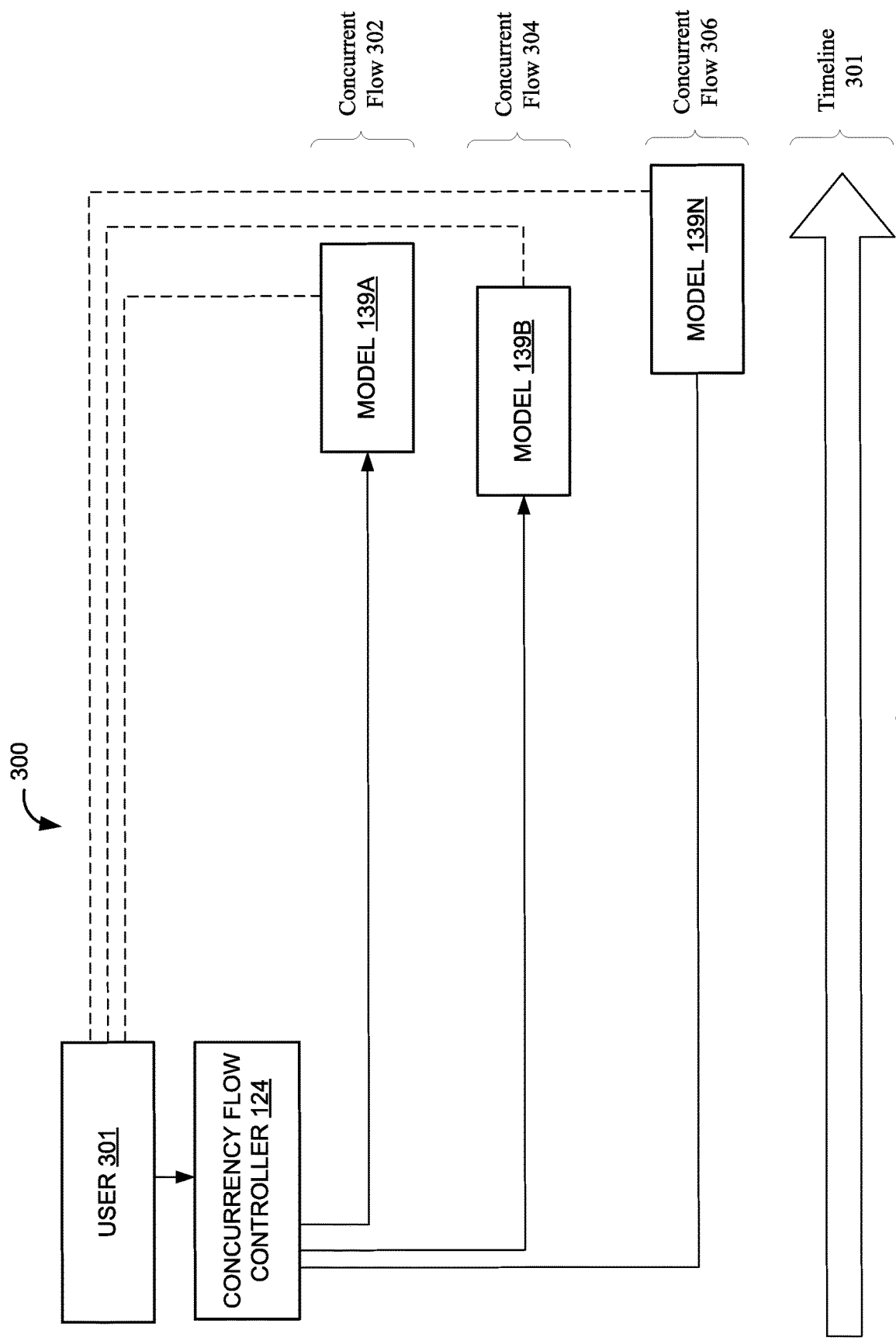
FIG. 3 illustrates a schematic diagram of concurrent flows that can be dynamically initiated based on user input, according to an implementation of the disclosure.

FIG. 3 illustrates a schematic diagram 300 of concurrent flows that can be dynamically initiated based on user input, according to an implementation of the disclosure. Upon initiation by a user 301, the concurrency flow controller 124 may concurrently start multiple concurrent flows 302, 304, 306 over a given timeline 301. Other numbers of concurrent flows specified by the user may be initiated as well. Each of the data flows represent data obtained from an intermediary store, user-specified subscription to datasets in the intermediary store, user-defined splitter functions that split the data into training, validating, and testing datasets, user-defined publication of the data, and routing of the output of the user-defined splitter functions to appropriate ML models 139. The dashed lines represent user monitoring of the outcomes of ML model 139 validation and testing. The user may then select which ML models 139 to deploy based on the user-defined concurrent flows 302.

Figure 4:
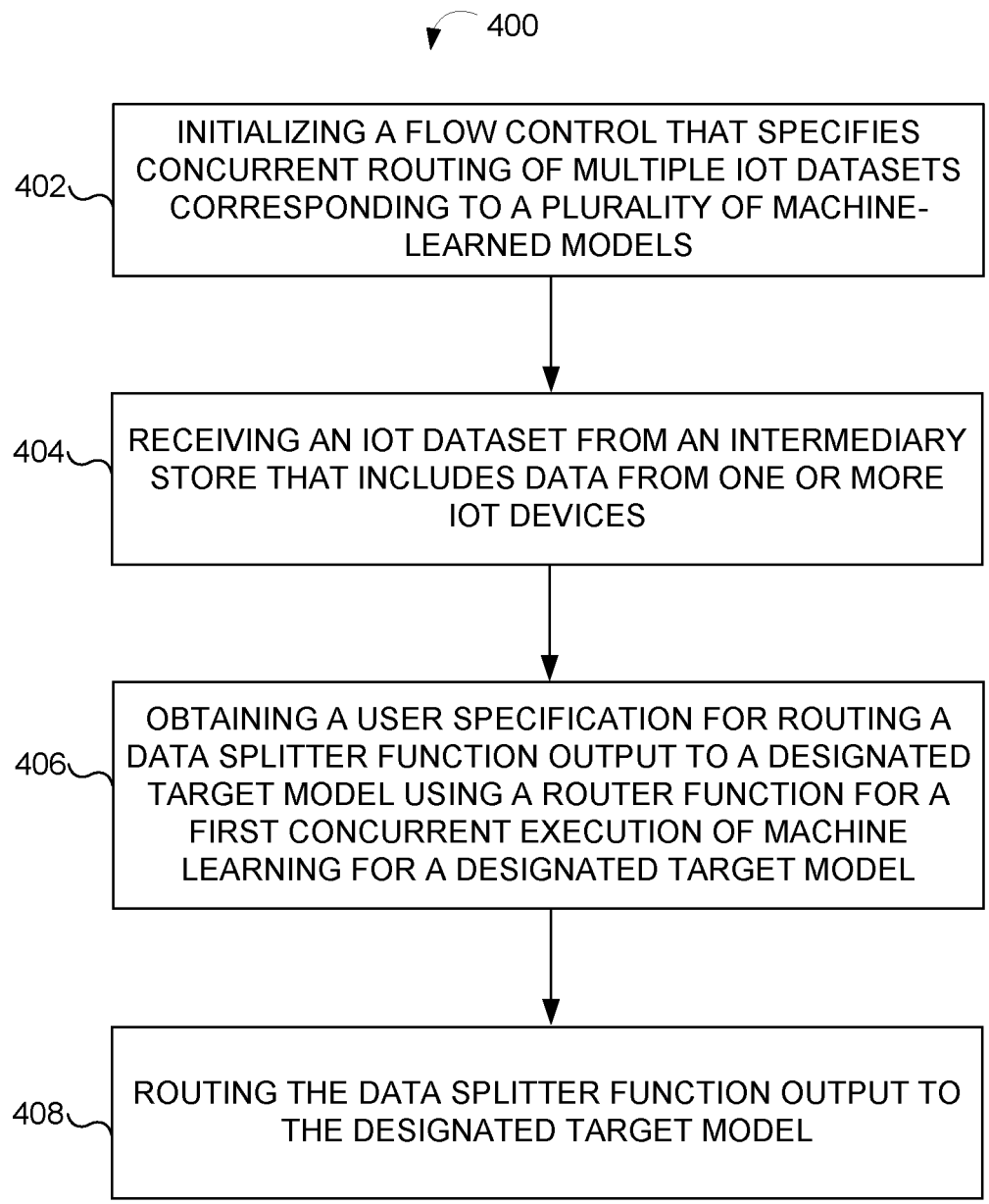
FIG. 4 illustrates a process of providing intelligent data split management of machine-learned models from datasets in an IoT environment, according to an implementation of the disclosure.

FIG. 4 depicts a process 400 of providing intelligent data split management of machine-learned models from datasets in an IoT environment, according to an implementation of the disclosure. In an operation 402, process 400 may include initializing a flow control that specifies concurrent routing of multiple IoT datasets corresponding to a plurality of machine-learned models.

In an operation 404, process 400 may include receiving an IoT dataset from an intermediary store that includes data from one or more IoT devices. In some implementations, operation 404 may include obtaining, after initializing the flow control, a first data splitting configuration that specifies splitting the IoT dataset, and then splitting the IoT dataset into at least one of a training dataset, a validation dataset, and a test dataset based on the first data splitting configuration.

In an operation 406, process 400 may include obtaining a user specification for routing a data splitter function output to a designated target model using a router function for a first concurrent execution of machine learning for a designated target model. In some instances, operation 406 may include receiving a second IoT dataset from the intermediary store for concurrent execution, and obtaining a second data splitting configuration for routing a data splitter function second output to a designated second target model using the router function for a second execution of machine learning for a second designated target model concurrent with the first concurrent execution of machine learning for the designated target model of the second IoT dataset that was split and published.

In some instances, a single IoT dataset may be split into multiple splitter sets to multiple target models. This may accelerate training models for the same source IoT dataset. In some instances, two or more IoT datasets may be split into multiple splitter sets to multiple target models. This may accelerate training models for different source IoT datasets.

In an operation 408, process 400 may include routing the data splitter function output to the designated target model. For implementations in which a data splitter function second output is generated, operation 408 may also include routing the data splitter function second output to the designated second target model. The designated first target model and may be a different version of the designated second target model or may be an altogether different model. In some instances, the first data splitting configuration and the second data splitting configuration may be applied by a single router at least partially concurrently.

In some implementations, process 400 may include receiving a first splitter function to be updated to the first dataset splitting configuration by the user, receiving a second function to be updated to the second dataset splitting configuration, updating the first dataset splitting configuration based on the first update, and updating, at least partially concurrently while updating the first dataset splitting configuration, the second dataset splitting configuration based on the second update.

Figure 5:
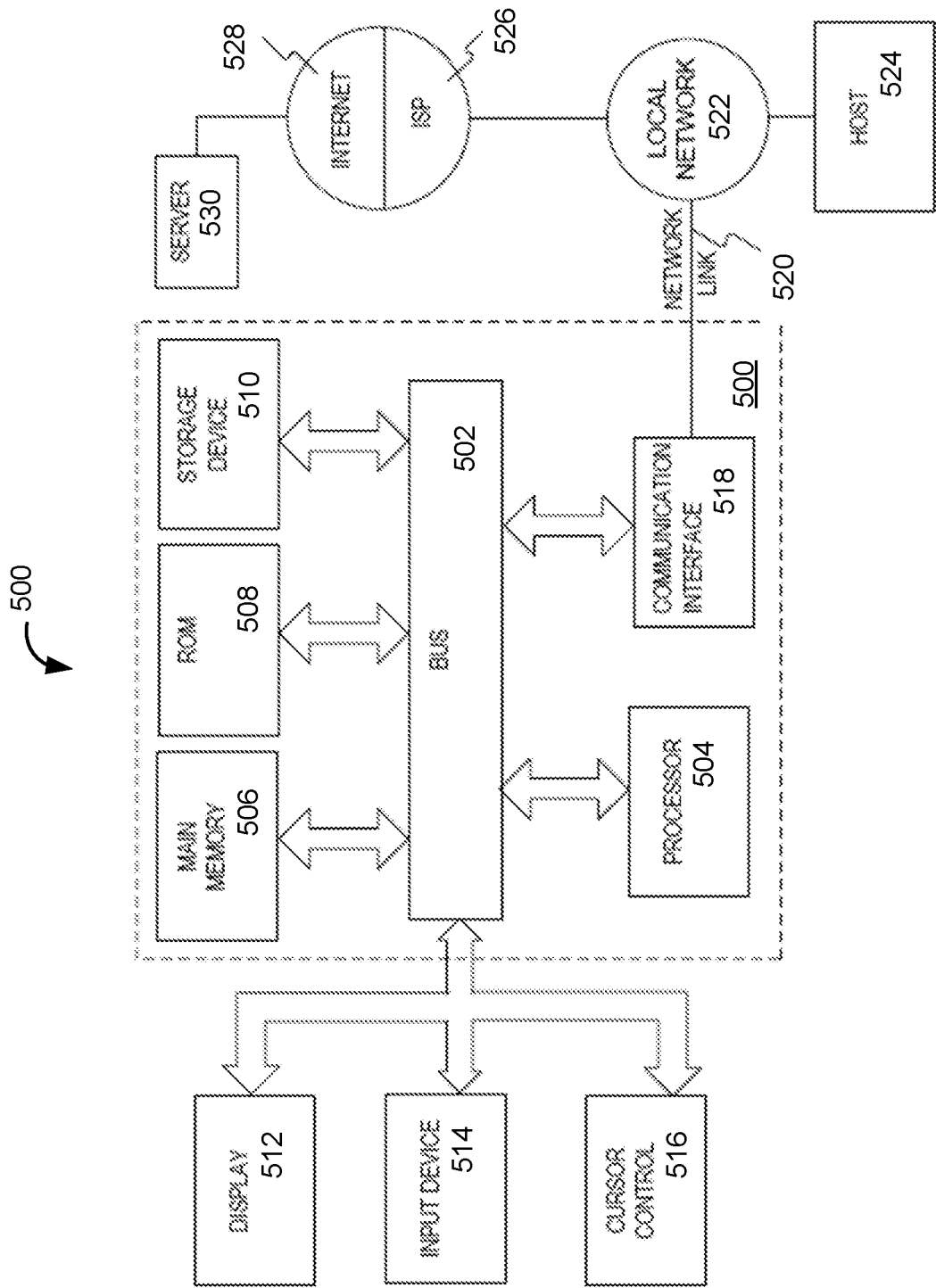
FIG. 5 depicts a block diagram of an example computer system in which any of the embodiments described herein may be implemented.

FIG. 5 depicts a block diagram of an example computer system 500 in which any of the embodiments described herein may be implemented. The various components of system 100 illustrated in FIG. 1 may be implemented according to the computer system 500. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link 520 typically provides data communication through one or more networks to other data devices. For example, a network link may provide a connection through local network to a host computer 524 or to data equipment operated by an Internet Service Provider (ISP) 526. The ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server 530 might transmit a requested code for an application program through the Internet 528, the ISP 526, the local network 522 and the communication interface 518.

The received code may be executed by processor 504 as it is received, and/or stored in storage device 510, or other non-volatile storage for later execution.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:
1. A method comprising:
  initializing a flow control that specifies concurrent routing of multiple IoT datasets corresponding to a plurality of machine-learned models;
  obtaining, after initializing the flow control, a first data splitting configuration that specifies splitting the IoT dataset;
  splitting the IoT dataset into at least one of a training dataset, a validation dataset, and a test dataset based on the first data splitting configuration;
  receiving an IoT dataset from an intermediary store that includes data from one or more IoT devices;

obtaining a user specification for routing a data splitter function output to a designated target model using a router function for a first concurrent execution of machine learning for a designated target model;
routing the data splitter function output to the designated target model;
receiving a second IoT dataset from the intermediary store;
obtaining a second data splitting configuration for routing a data splitter function second output to a designated second target model using the router function for a second execution of machine learning for a second designated target model concurrent with the first concurrent execution of machine learning for the designated target model;
routing the data splitter function second output to the designated second target model;
applying the first data splitting configuration during a first period of time; and
applying the second data splitting configuration during a second period of time at least partially concurrent with the first period of time.

2. The method of claim 1, wherein the designated second target model comprises a different version of the designated target model.

3. The method of claim 1, further comprising:
applying the first data splitting configuration and the second data splitting configuration by a single router.

4. The method of claim 1, further comprising:
receiving a first splitter function to be updated to the first dataset splitting configuration by the user;
receiving a second function to be updated to the second dataset splitting configuration;
updating the first dataset splitting configuration based on the first update; and
updating, at least partially concurrently while updating the first dataset splitting configuration, the second dataset splitting configuration based on the second update.

5. The method of claim 1, further comprising:
obtaining a second data splitting configuration for routing a data splitter function second output, based on the IoT training dataset, to a designated second target model using the router function for a second execution of machine learning for a second designated target model concurrent with the first concurrent execution of machine learning for the designated target model; and
routing the data splitter function second output to the designated second target model.

6. A system comprising:
a computer system having one or more processors programmed to:
initialize a flow control that specifies concurrent routing of multiple sensor datasets corresponding to a plurality of machine-learned models;
obtain, after initialization of the flow control, a first data splitting configuration that specifies splitting the sensor dataset;
split the sensor dataset into at least one of a training dataset, a validation dataset, and a test dataset based on the first data splitting configuration;
receive a sensor dataset from an intermediary store that includes data originating from one or more sensor devices;
obtain a user specification for routing a data splitter function output to a designated target model using a router function for a first concurrent execution of machine learning for a designated target model;
route the data splitter function output to the designated target model;
receive a second sensor dataset from the intermediary store;
obtain a second data splitting configuration for routing a data splitter function second output to a designated second target model using the router function for a second execution of machine learning for a second designated target model concurrent with the first concurrent execution of machine learning for the designated target model;
route the data splitter function second output to the designated second target model;
apply the first data splitting configuration during a first period of time; and
apply the second data splitting configuration during a second period of time at least partially concurrent with the first period of time.

7. The system of claim 6, wherein the designated second target model comprises a different version of the designated target model.

8. The system of claim 6, the computer system further programmed to: apply the first data splitting configuration and the second data splitting configuration by a single router.

9. The system of claim 6, the computer system further programmed to:
receive a first splitter function to be updated to the first dataset splitting configuration by the user; receive a second function to be updated to the second dataset splitting configuration;
update the first dataset splitting configuration based on the first update; and
update, at least partially concurrently while updating the first dataset splitting configuration, the second dataset splitting configuration based on the second update.

10. The system of claim 6, the computer system further programmed to:
obtain a second data splitting configuration for routing a data splitter function second output, based on the sensor training dataset, to a designated second target model using the router function for a second execution of machine learning for a second designated target model concurrent with the first concurrent execution of machine learning for the designated target model; and
route the data splitter function second output to the designated second target model.

11. A computer readable storage medium comprising instructions, when executed on a computer system, programs the computer system to:
initialize a flow control that specifies concurrent routing of multiple sensor datasets corresponding to a plurality of machine-learned models;
obtain, after initialization of the flow control, a first data splitting configuration that specifies splitting the sensor dataset;
split the sensor dataset into at least one of a training dataset, a validation dataset, and a test dataset based on the first data splitting configuration;
receive a sensor dataset from an intermediary store that includes data originating from one or more sensor devices;
obtain a user specification for routing a data splitter function output to a designated target model using a router function for a first concurrent execution of machine learning for a designated target model;

route the data splitter function output to the designated target model;
receive a second sensor dataset from the intermediary store;
obtain a second data splitting configuration for routing a data splitter function second output to a designated second target model using the router function for a second execution of machine learning for a second designated target model concurrent with the first concurrent execution of machine learning for the designated target model;
route the data splitter function second output to the designated second target model;
apply the first data splitting configuration during a first period of time; and
apply the second data splitting configuration during a second period of time at least partially concurrent with the first period of time.

* * * * *